United States Patent
Xu et al.

(10) Patent No.: US 11,599,972 B1
(45) Date of Patent: Mar. 7, 2023

(54) METHOD AND SYSTEM FOR LOSSY IMAGE OR VIDEO ENCODING, TRANSMISSION AND DECODING

(71) Applicant: DEEP RENDER LTD, London (GB)

(72) Inventors: Jan Xu, London (GB); Chri Besenbruch, London (GB); Arsalan Zafar, London (GB)

(73) Assignee: DEEP RENDER LTD., London (GB)

( * ) Notice: Subject to any disclaimer, the term of this patent is extended or adjusted under 35 U.S.C. 154(b) by 0 days.

(21) Appl. No.: 17/748,604

(22) Filed: May 19, 2022

(30) Foreign Application Priority Data

Dec. 22, 2021 (GB) ...................... 2118730

(51) Int. Cl.
| | | |
|---|---|---|
| *G06T 5/00* | (2006.01) | |
| *G06T 3/40* | (2006.01) | |
| *G06N 3/04* | (2023.01) | |
| *G06N 3/08* | (2023.01) | |

(52) U.S. Cl.
CPC ............ *G06T 5/002* (2013.01); *G06N 3/0454* (2013.01); *G06N 3/08* (2013.01); *G06T 3/40* (2013.01); *G06T 2207/20081* (2013.01); *G06T 2207/20084* (2013.01)

(58) Field of Classification Search
CPC . G06T 5/002; G06T 3/40; G06T 2207/20081; G06T 2207/20084; G06N 3/0454; G06N 3/08
See application file for complete search history.

(56) References Cited

U.S. PATENT DOCUMENTS

| | | | | |
|---|---|---|---|---|
| 10,373,300 | B1* | 8/2019 | Besenbruch | G06T 7/0002 |
| 10,984,560 | B1* | 4/2021 | Appalaraju | H04N 19/48 |
| 2019/0355098 | A1* | 11/2019 | Ferrés | G06T 5/002 |
| 2020/0027247 | A1* | 1/2020 | Minnen | G06N 3/0454 |
| 2020/0090069 | A1* | 3/2020 | Mandt | G06N 3/0445 |
| 2020/0107023 | A1* | 4/2020 | Lee | H04N 19/149 |
| 2020/0304802 | A1* | 9/2020 | Habibian | G06N 3/0472 |
| 2021/0067808 | A1* | 3/2021 | Schroers | H04N 19/12 |
| 2021/0211741 | A1* | 7/2021 | Andreopoulos | H04N 19/147 |
| 2021/0350179 | A1* | 11/2021 | Bello | G06N 3/0454 |
| 2021/0360259 | A1* | 11/2021 | Wang | H04N 19/85 |
| 2022/0103839 | A1* | 3/2022 | Van Rozendaal | G06N 3/088 |
| 2022/0108712 | A1* | 4/2022 | Song | G10L 25/30 |
| 2022/0174328 | A1* | 6/2022 | Toderici | H04N 19/91 |
| 2022/0189456 | A1* | 6/2022 | Pang | G10L 13/027 |
| 2022/0215298 | A1* | 7/2022 | Tao | G06K 9/6257 |
| 2022/0272345 | A1* | 8/2022 | Besenbruch | H04N 19/124 |

(Continued)

OTHER PUBLICATIONS

Nichol, A., et al., "Improved Denoising Diffusion Probabilistic Models", Proceedings of the 38th International Conference on Machine Learning, PMLR 139, Jul. 2021.*

(Continued)

*Primary Examiner* — Xuemei G Chen
(74) *Attorney, Agent, or Firm* — Saul Ewing LLP

(57) ABSTRACT

There is provided a method for lossy image or video encoding and transmission, including the steps of receiving an input image at a first computer system, encoding the input image using a first trained neural network to produce a latent representation, performing a quantization process on the latent representation to produce a quantized latent, and transmitting the quantized latent to a second computer system.

9 Claims, 10 Drawing Sheets

(56) References Cited

U.S. PATENT DOCUMENTS

2022/0277492 A1\* 9/2022 Ryder ..................... G06N 3/08
2022/0279183 A1\* 9/2022 Besenbruch ......... G06N 3/0472

OTHER PUBLICATIONS

Ho, Jonathan, et al., Denoising diffusion probabilistic models. arXiv preprint arXiv:2006.11239, 2020.

Saharia, Chitwan, et al., Image super-resolution via iterative refinement. arXiv preprint arXiv:2104.07636, 2021.

\* cited by examiner

METHOD AND SYSTEM FOR LOSSY IMAGE OR VIDEO ENCODING, TRANSMISSION AND DECODING

CROSS-REFERENCE TO RELATED APPLICATION

This application is based on, and claims priority to GB Application No. GB2118730.7, filed on Dec. 22, 2021, the entire contents of which being fully incorporated herein by reference.

This invention relates to a method and system for lossy image or video encoding, transmission and decoding, a method, apparatus, computer program and computer readable storage medium for lossy image or video encoding and transmission, and a method, apparatus, computer program and computer readable storage medium for lossy image or video receipt and decoding. There is increasing demand from users of communications networks for images and video content. Demand is increasing not just for the number of images viewed, and for the playing time of video; demand is also increasing for higher resolution content. This places increasing demand on communications networks and increases their energy use because of the larger amount of data being transmitted. To reduce the impact of these issues, image and video content is compressed for transmission across the network. The compression of image and video content can be lossless or lossy compression. In lossless compression, the image or video is compressed such that all of the original information in the content can be recovered on decompression. However, when using lossless compression there is a limit to the reduction in data quantity that can be achieved. In lossy compression, some information is lost from the image or video during the compression process. Known compression techniques attempt to minimise the apparent loss of information by the removal of information that results in changes to the decompressed image or video that is not particularly noticeable to the human visual system. Artificial intelligence (AI) based compression techniques achieve compression and decompression of images and videos through the use of trained neural networks in the compression and decompression process. Typically, during training of the neutral networks, the difference between the original image and video and the compressed and decompressed image and video is analyzed and the parameters of the neural networks are modified to reduce this difference while minimizing the data required to transmit the content. However, AI based compression methods may achieve poor compression results in terms of the appearance of the compressed image or video or the amount of information required to be transmitted.

According to the present invention there is provided a method for lossy image or video encoding, transmission and decoding, the method comprising the steps of: receiving an input image at a first computer system; encoding the input image using a first trained neural network to produce a latent representation; performing a quantization process on the latent representation to produce a quantized latent; transmitting the quantized latent to a second computer system; decoding the quantized latent using a denoising process to produce an output image, wherein the output image is an approximation of the input image.

The denoising process may be performed by a trained denoising model.

The trained denoising model may be a second trained neural network.

The denoising process may be an iterative process and may include a denoising function configured to predict a noise vector; wherein the denoising function receives as input an output of the previous iterative step, the data based on the latent representation and parameters describing a noise distribution; and the noise vector is applied to the output of the previous iterative step to obtain the output of the current iterative step.

The parameters describing the noise distribution may specify the variance of the noise distribution.

The noise distribution may be a gaussian distribution.

The initial input to the denoising process may be sampled from gaussian noise.

The data based on the latent representation may be upsampled prior to the application of the denoising process.

According to the present invention there is provided a method of training one or more models including neural networks, the one or more models being for use in lossy image or video encoding, transmission and decoding, the method comprising the steps of: receiving a first input training image; encoding the first input training image using a first neural network to produce a latent representation; performing a quantization process on the latent representation to produce a quantized latent; decoding the quantized latent using a denoising model to produce an output image, wherein the output image is an approximation of the input training image; evaluating a loss function based on the rate of the quantized latent; evaluating a gradient of the loss function; back-propagating the gradient of the loss function through the first neural network to update the parameters of the first neural network; repeating the above steps using a first set of training images to produce a first trained neural network.

The loss function may include a denoising loss; and the denoising process may include a denoising function configured to predict a noise vector; wherein the denoising function receives as input the first input training image with added noise, the data based on the latent representation and parameters describing a noise distribution; the denoising loss is evaluated based on a difference between the predicted noise vector and the noise added to the first training image; and back-propagation the gradient of the loss function is additionally performed through the denoising model to update the parameters of the denoising model to produce a trained denoising model.

The loss function may include a distortion loss based on differences between the output image and the input training image.

According to the present invention there is provided a method for lossy image or video encoding and transmission, the method comprising the steps of: receiving an input image at a first computer system; encoding the input image using a first trained neural network to produce a latent representation; performing a quantization process on the latent representation to produce a quantized latent; and transmitting the quantized latent to a second computer system.

According to the present invention there is provided a method for lossy image or video receipt and decoding, the method comprising the steps of: receiving the quantized latent encoded according to the method for lossy image or video encoding and transmission above at a second computer system; decoding the quantized latent using a denoising process to produce an output image, wherein the output image is an approximation of the input image.

According to the present invention there is provided a data processing system configured to perform the method for lossy image or video encoding, transmission and decoding above.

According to the present invention there is provided a data processing apparatus configured to perform the method for lossy image or video encoding and transmission or the method for lossy image or video receipt and decoding above.

According to the present invention there is provided a computer program comprising instructions which, when the program is executed by a computer, cause the computer to carry out the method for lossy image or video encoding and transmission or the method for lossy image or video receipt and decoding above.

According to the present invention there is provided a computer-readable storage medium comprising instructions which, when executed by a computer, cause the computer to carry out the method for lossy image or video encoding and transmission or the method for lossy image or video receipt and decoding above.

Aspects of the invention will now be described by way of examples, with reference to the following figures in which.

Figure 1:
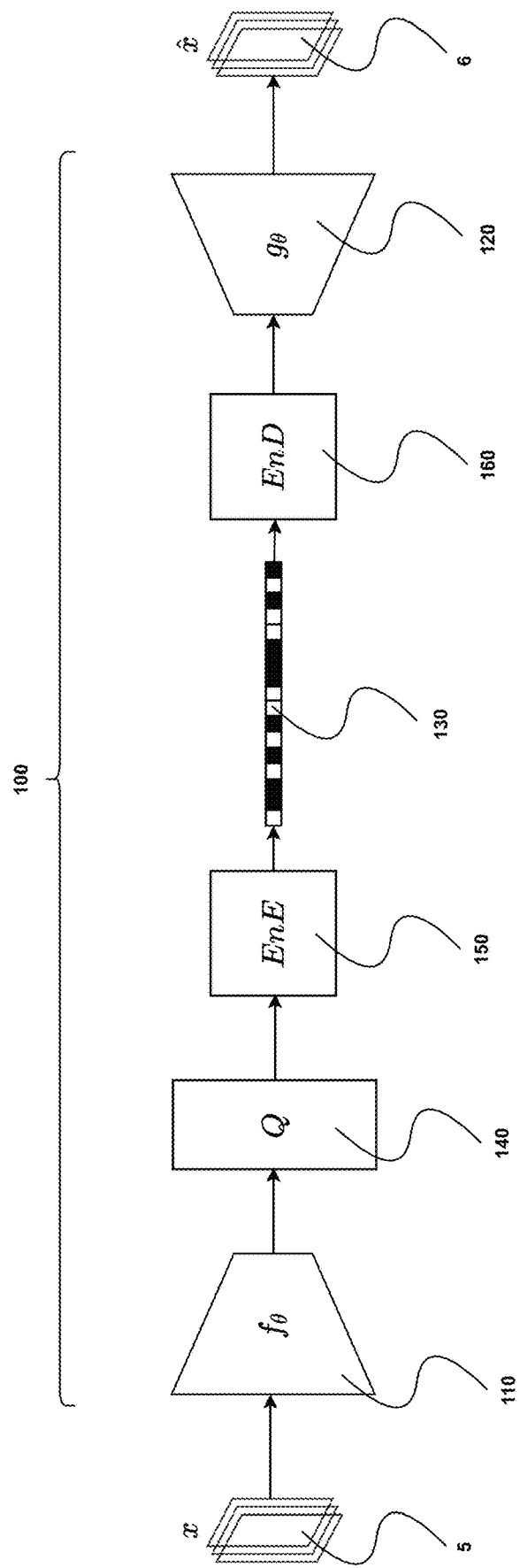
FIG. 1 illustrates an example of an image or video compression, transmission and decompression pipeline.

Compression processes may be applied to any form of information to reduce the amount of data, or file size, required to store that information. Image and video information is an example of information that may be compressed. The file size required to store the information, particularly during a compression process when referring to the compressed file, may be referred to as the rate. In general, compression can be lossless or lossy. In both forms of compression, the file size is reduced. However, in lossless compression, no information is lost when the information is compressed and subsequently decompressed. This means that the original file storing the information is fully reconstructed during the decompression process. In contrast to this, in lossy compression information may be lost in the compression and decompression process and the reconstructed file may differ from the original file. Image and video files containing image and video data are common targets for compression. JPEG, JPEG2000, AVC, HEVC and AVI are examples of compression processes for image and/or video files.

In a compression process involving an image, the input image may be represented as x. The data representing the image may be stored in a tensor of dimensions H x W x C, where H represents the height of the image, W represents the width of the image and C represents the number of channels of the image. Each H x W data point of the image represents a pixel value of the image at the corresponding location. Each channel C of the image represents a different component of the image for each pixel which are combined when the image file is displayed by a device. For example, an image file may have 3 channels with the channels representing the red, green and blue component of the image respectively. In this case, the image information is stored in the RGB colour space, which may also be referred to as a model or a format. Other examples of colour spaces or formats include the CMKY and the YCbCr colour models. However, the channels of an image file are not limited to storing colour information and other information may be represented in the channels. As a video may be considered a series of images in sequence, any compression process that may be applied to an image may also be applied to a video. Each image making up a video may be referred to as a frame of the video.

The output image may differ from the input image and may be represented by $\hat{x}$. The difference between the input image and the output image may be referred to as distortion or a difference in image quality. The distortion can be measured using any distortion function which receives the input image and the output image and provides an output which represents the difference between input image and the output image in a numerical way. An example of such a method is using the mean square error (MSE) between the pixels of the input image and the output image, but there are many other ways of measuring distortion, as will be known to the person skilled in the art. The distortion function may comprise a trained neural network.

Typically, the rate and distortion of a lossy compression process are related. An increase in the rate may result in a decrease in the distortion, and a decrease in the rate may result in an increase in the distortion. Changes to the distortion may affect the rate in a corresponding manner. A relation between these quantities for a given compression technique may be defined by a rate-distortion equation.

AI based compression processes may involve the use of neural networks. A neural network is an operation that can be performed on an input to produce an output. A neural network may be made up of a plurality of layers. The first layer of the network receives the input. One or more operations may be performed on the input by the layer to produce an output of the first layer. The output of the first layer is then passed to the next layer of the network which may perform one or more operations in a similar way. The output of the final layer is the output of the neural network.

Each layer of the neural network may be divided into nodes. Each node may receive at least part of the input from the previous layer and provide an output to one or more nodes in a subsequent layer. Each node of a layer may perform the one or more operations of the layer on at least part of the input to the layer. For example, a node may receive an input from one or more nodes of the previous layer. The one or more operations may include a convolution, a weight, a bias and an activation function. Convolution operations are used in convolutional neural networks. When a convolution operation is present, the convolution may be performed across the entire input to a layer. Alternatively, the convolution may be performed on at least part of the input to the layer.

Each of the one or more operations is defined by one or more parameters that are associated with each operation. For example, the weight operation may be defined by a weight matrix defining the weight to be applied to each input from each node in the previous layer to each node in the present layer. In this example, each of the values in the weight matrix is a parameter of the neural network. The convolution may be defined by a convolution matrix, also known as a kernel. In this example, one or more of the values in the convolution matrix may be a parameter of the neural network. The activation function may also be defined by values which may be parameters of the neural network. The parameters of the network may be varied during training of the network.

Other features of the neural network may be predetermined and therefore not varied during training of the network. For example, the number of layers of the network, the number of nodes of the network, the one or more operations performed in each layer and the connections between the layers may be predetermined and therefore fixed before the training process takes place. These features that are predetermined may be referred to as the hyperparameters of the network. These features are sometimes referred to as the architecture of the network.

To train the neural network, a training set of inputs may be used for which the expected output, sometimes referred to as the ground truth, is known. The initial parameters of the neural network are randomized and the first training input is provided to the network. The output of the network is compared to the expected output, and based on a difference between the output and the expected output the parameters of the network are varied such that the difference between the output of the network and the expected output is reduced. This process is then repeated for a plurality of training inputs to train the network. The difference between the output of the network and the expected output may be defined by a loss function. The result of the loss function may be calculated using the difference between the output of the network and the expected output to determine the gradient of the loss function. Back-propagation of the gradient descent of the loss function may be used to update the parameters of the neural network using the gradients $dL/dy$ of the loss function. A plurality of neural networks in a system may be trained simultaneously through back-propagation of the gradient of the loss function to each network.

In the case of AI based image or video compression, the loss function may be defined by the rate distortion equation. The rate distortion equation may be represented by Loss=D+ $\lambda$* R, where D is the distortion function, $\lambda$ is a weighting factor, and R is the rate loss. $\lambda$ may be referred to as a lagrange multiplier. The langrange multiplier provides as weight for a particular term of the loss function in relation to each other term and can be used to control which terms of the loss function are favoured when training the network.

In the case of AI based image or video compression, a training set of input images may be used. An example training set of input images is the KODAK image set (for example at www.cs.albany.edu/xypan/research/snr/Kodak.html). An example training set of input images is the IMAX image set. An example training set of input images is the Imagenet dataset (for example at www.image-net.org/download). An example training set of input images is the CLIC Training Dataset P ("professional") and M ("mobile") (for example at http://challenge.compression.cc/tasks/).

An example of an AI based compression process 100 is shown in FIG. 1. As a first step in the AI based compression process, an input image 5 is provided. The input image 5 is provided to a trained neural network 110 characterized by a function $f\theta$ acting as an encoder. The encoder neural network 110 produces an output based on the input image. This output is referred to as a latent representation of the input image 5. In a second step, the latent representation is quantized in a quantisation process 140 characterised by the operation Q, resulting in a quantized latent. The quantisation process transforms the continuous latent representation into a discrete quantized latent. An example of a quantization process is a rounding function.

In a third step, the quantized latent is entropy encoded in an entropy encoding process 150 to produce a bitstream 130. The entropy encoding process may be for example, range or arithmetic encoding. In a fourth step, the bitstream 130 may be transmitted across a communication network.

In a fifth step, the bitstream is entropy decoded in an entropy decoding process 160. The quantized latent is provided to another trained neural network 120 characterized by a function $g_\theta$ acting as a decoder, which decodes the quantized latent. The trained neural network 120 produces an output based on the quantized latent. The output may be the output image of the AI based compression process 100. The encoder-decoder system may be referred to as an autoencoder.

The system described above may be distributed across multiple locations and/or devices. For example, the encoder 110 may be located on a device such as a laptop computer, desktop computer, smart phone or server. The decoder 120 may be located on a separate device which may be referred to as a recipient device. The system used to encode, transmit and decode the input image 5 to obtain the output image 6 may be referred to as a compression pipeline.

Figure 2:
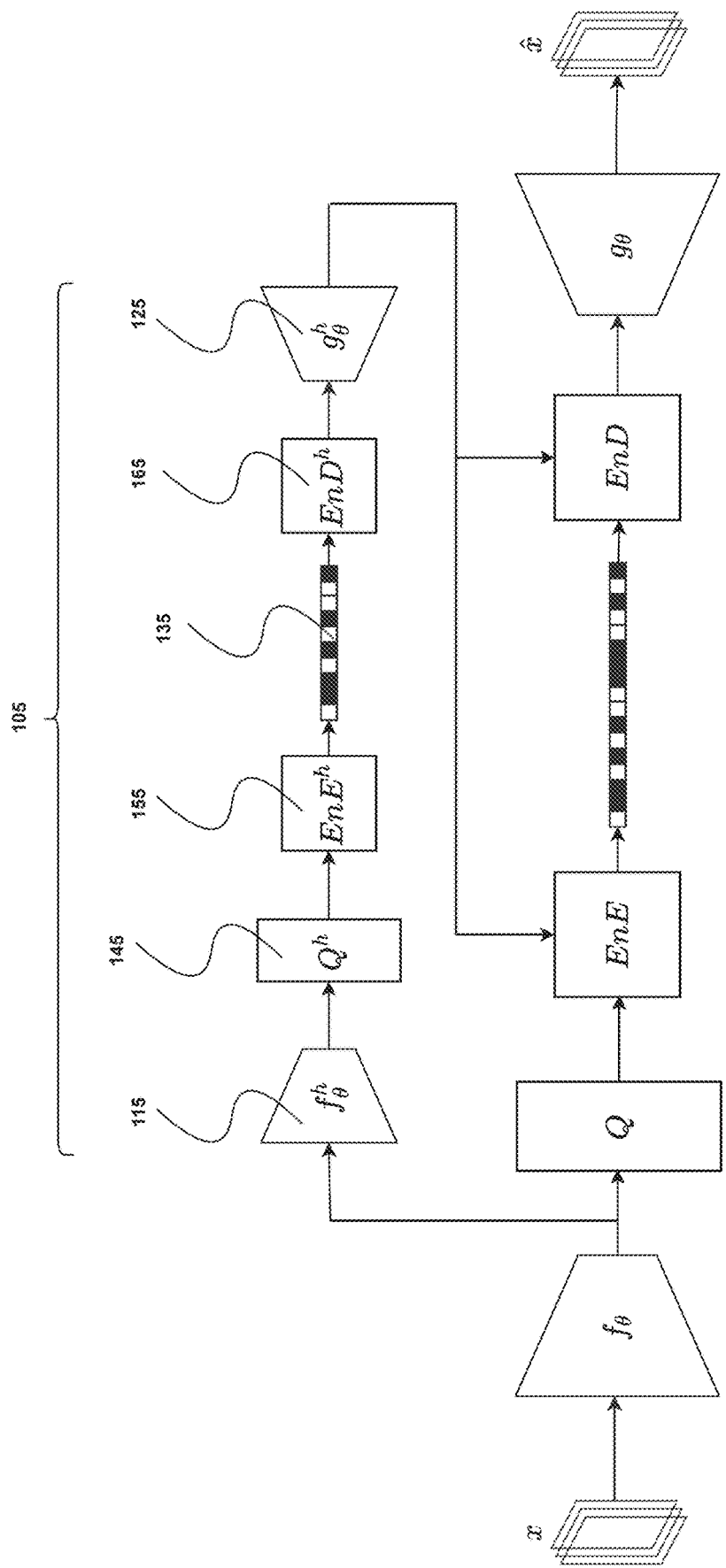
FIG. 2 illustrates a further example of an image or video compression, transmission and decompression pipeline including a hyper-network.

The AI based compression process may further comprise a hyper-network 105 for the transmission of meta-information that improves the compression process. The hyper-network 105 comprises a trained neural network 115 acting as a hyper-encoder $f_\theta^h$ and a trained neural network 125 acting as a hyper-decoder $g_\theta^h$. An example of such a system is shown in FIG. 2. Components of the system not further discussed may be assumed to be the same as discussed above. The neural network 115 acting as a hyper-decoder receives the latent that is the output of the encoder 110. The hyper-encoder 115 produces an output based on the latent representation that may be referred to as a hyper-latent representation. The hyper-latent is then quantized in a quantization process 145 characterised by $Q^h$ to produce a quantized hyper-latent. The quantization process 145 characterised by $Q^h$ may be the same as the quantization process 140 characterised by Q discussed above.

In a similar manner as discussed above for the quantized latent, the quantized hyper-latent is then entropy encoded in an entropy encoding process 155 to produce a bitstream 135. The bitstream 135 may be entropy decoded in an entropy decoding process 165 to retrieve the quantized hyper-latent. The quantized hyper-latent is then used as an input to trained neural network 125 acting as a hyper-decoder. However, in contrast to the compression pipeline 100, the output of the hyper-decoder may not be an approximation of the input to the hyper-decoder 115. Instead, the output of the hyper-decoder is used to provide parameters for use in the entropy encoding process 150 and entropy decoding process 160 in the main compression process 100. For example, the output of the hyper-decoder 125 can include one or more of the mean, standard deviation, variance or any other parameter used to describe a probability model for the entropy encoding process 150 and entropy decoding process 160 of the latent representation. In the example shown in FIG. 2, only a single entropy decoding process 165 and hyper-decoder 125 is shown for simplicity. However, in practice, as the decompression process usually takes place on a separate device, duplicates of these processes will be present on the device used for encoding to provide the parameters to be used in the entropy encoding process 150.

To perform training of the AI based compression process described above, a training set of input images may be used as described above. During the training process, the parameters of both the encoder 110 and the decoder 120 may be simultaneously updated in each training step. If a hyper-network 105 is also present, the parameters of both the hyper-encoder 115 and the hyper-decoder 125 may additionally be simultaneously updated in each training step The training process may further include a generative adversarial network (GAN). When applied to an AI based compression process, in addition to the compression pipeline described above, an additional neutral network acting as a discriminator is included in the system. The discriminator receives an input and outputs a score based on the input providing an indication of whether the discriminator considers the input to be ground truth or fake. For example, the indicator may be a score, with a high score associated with a ground truth input and a low score associated with a fake input. For training of a discriminator, a loss function is used that maximizes the difference in the output indication between an input ground truth and input fake.

When a GAN is incorporated into the training of the compression process, the output image 6 may be provided to the discriminator. The output of the discriminator may then be used in the loss function of the compression process as a measure of the distortion of the compression process. Alternatively, the discriminator may receive both the input image 5 and the output image 6 and the difference in output indication may then be used in the loss function of the compression process as a measure of the distortion of the compression process. Training of the neural network acting as a discriminator and the other neutral networks in the compression process may be performed simultaneously. During use of the trained compression pipeline for the compression and transmission of images or video, the discriminator neural network is removed from the system and the output of the compression pipeline is the output image 6.

Incorporation of a GAN into the training process may cause the decoder 120 to perform hallucination. Hallucination is the process of adding information in the output image 6 that was not present in the input image 5. In an example, hallucination may add fine detail to the output image 6 that was not present in the input image 5 or received by the decoder 120. The hallucination performed may be based on information in the quantized latent received by decoder 120.

Diffusion models are a class of generative model, where in the training process, we incrementally add noise to a sample/image, and learn a function (the denoising function), that learns to remove this noise. In the reverse/generative process, we denoise that sample, starting from a sample of a standard normal. Some aspects of diffusion models will not be discussed in detail, such as the forward process or the sampling process, as these are explained in "Jonathan Ho, Ajay Jain, and Pieter Abbeel. Denoising diffusion probabilistic models. arXiv preprint arXiv:2006.11239, 2020" and "Chitwan Saharia, Jonathan Ho, William Chan, Tim Salimans, David J Fleet, and Mohammad Norouzi. Image super-resolution via iterative refinement. arXiv preprint arXiv:2104.07636, 2021" which are hereby incorporated by reference, The application of diffusion models to an AI based compression pipeline as discussed above is set out below.

The decoder in the encoder-decoder pipeline may be replicated with a conditional diffusion decoder (CDD). An example of a CDD is described in "Chitwan Saharia, Jonathan Ho, William Chan, Tim Salimans, David J Fleet, and Mohammad Norouzi. Image super-resolution via iterative refinement. arXiv preprint arXiv:2104.07636, 2021". The aim of the CCD when applied in an AI based compression pipeline is to reconstruct the input image given the quantized latents over some number of timesteps T, starting from a sample from a standard normal conditioned with our latent. This is done through iteratively removing noise from the previous sample $x_t$ to get $x_{t-1}$ until we reach $x_0$, which is our image to be decoded. The initial input to the CCD is a sample from a standard normal, conditioned with upsampled latents.

Figure 6:
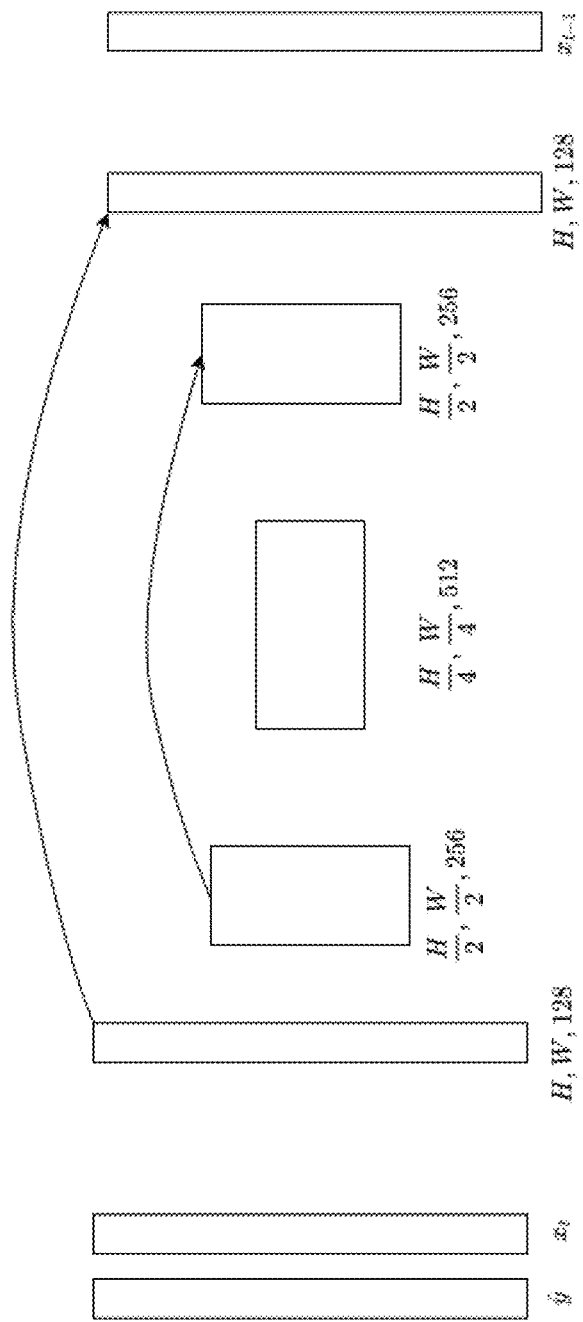
FIG. 6 illustrates an example architecture of a denosing model.
Figure 7:
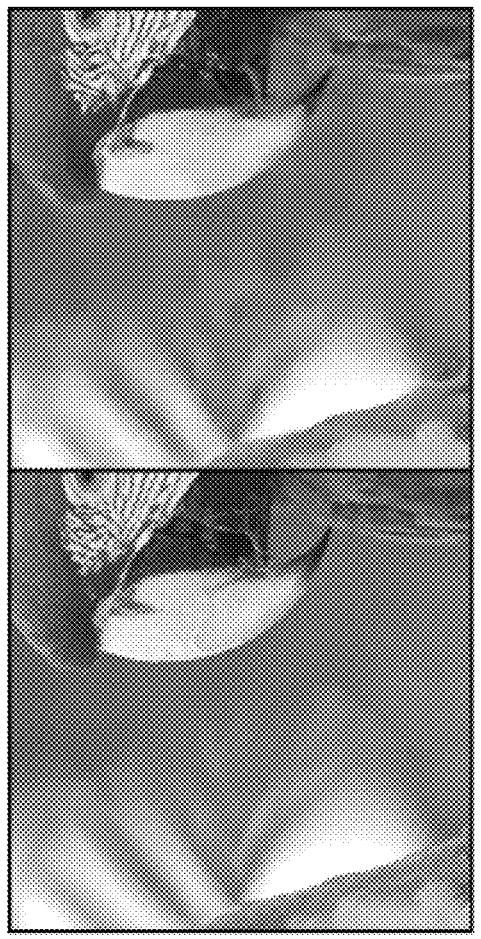
FIGS. 7 to 10 illustrate examples of decoded images using the CCD pipeline.
Figure 8:
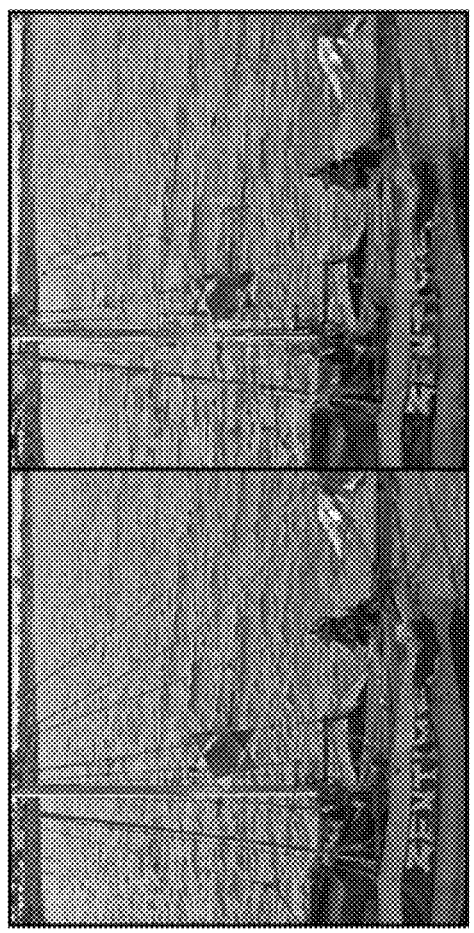
Figure 9:
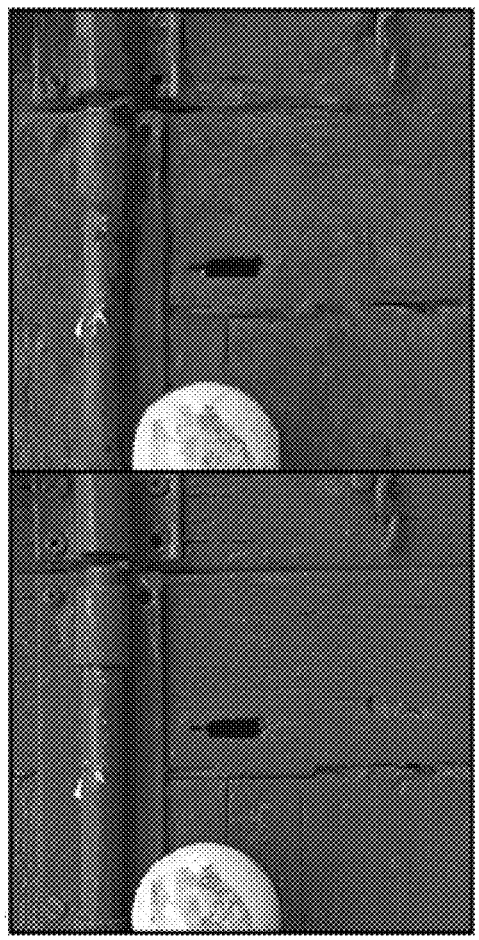
Figure 10:

Until the decoder, the architecture of the system is the same as the AI compression pipeline discussed above. There are no limitations on the entropy module or the addition of hyper and context modules to the entropy module. After our y latent is quantised, the architecture is different. In the first layer of our new decoder, the CCD, we upsample (Nearest neighbour) our quantised latent space to the image scale as our conditional diffusion decoder (CDD) operates in the image resolution. This upsampled quantised latent is then used to condition the CCD noise input $x_t$. An example architecture is shown in FIG. 6.

Figure 3:
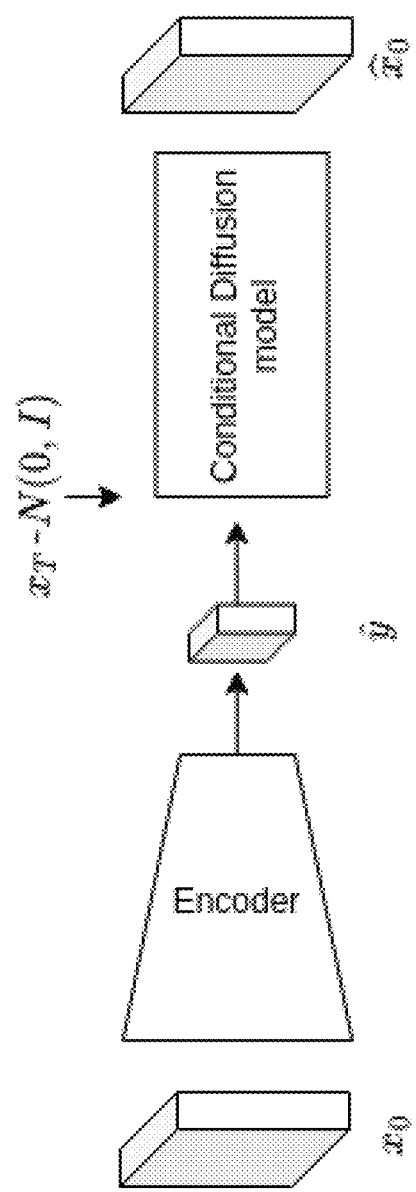
FIG. 3 illustrates a pipeline for AI based compression using conditional denoising decoders (CDDs). $x_0$ represents the image to be encoded, $\hat{x}_0$ represents the reconstructed image, and $\hat{y}$ is the quantised latent space.

The training function may have two components. The first is the standard rate loss as discussed above, and the second is a loss for the denoising function, called the denoising loss. The aim of the rate is to minimise the number of bits required to encode y, and the aim of the denoising loss is to learn a function that can predict the noise that was added to a sample. The training or loss function may additionally include a distortion loss as discussed above. In the case where the distortion loss is not used, the gradients used to update the parameters of the encoder now come from the denoising loss. This provides the denosing function with an informative conditioned latent to reconstruct Algorithm 1 explains the training process in detail and FIG. 3 shows the entire pipeline.

---

Algorithm 1 Example algorithm for a single training step for a conditional diffusion decoder for compression. $x_0$ is the current sample, and during training we iterate through N images where N is the size of our training dataset

---

Inputs:

Input image: $x_0$
Encoder network: $E_\phi$
Decoder network: $D_\phi$
Denoising function: $g_\theta$
Optimizer encoder decoder: $opt_\phi$
Variance schedule: $\beta_{1...T}$
$\alpha_t = \sqrt{1-\beta_t}$
$\bar{\alpha}_t = \Pi_{s=1}^{t} \alpha_s$
Rate loss calculation:

y ← Encoder$_\phi$(x)
ŷ ← Quantise(y)
$L_{rate}$ ← Rate(ŷ)
Diffusion loss calculation:

t ~ U(0, T)
$\bar{\alpha} = \Pi_{s=1}^{t} \alpha_s$
$\epsilon$ ~ N(0, 1)

$x_t \leftarrow \sqrt{\bar{\alpha}} x_0 + \sqrt{1-\bar{\alpha}} \epsilon$ $\epsilon_\theta \leftarrow g_\theta(x_t, \hat{y}, t)$
$L_{diffusion} \leftarrow \|\epsilon_\theta - \epsilon\|_2^2$
Distortion loss calculation:

$\hat{x}_0$ ← Decoder(ŷ)
$L_{MSE} \leftarrow \|\hat{x}_0 - x_0\|$
Optimisation:

$L_{total} \leftarrow L_{MSE} + L_{rate} + L_{diffusion}$

-continued

Algorithm 1 Example algorithm for a single training step for a conditional diffusion decoder for compression. $x_0$ is the current sample, and during training we iterate through N images where N is the size of our training dataset backpropagate($L_{total}$)
step(opt$_\phi$)

Figure 4:
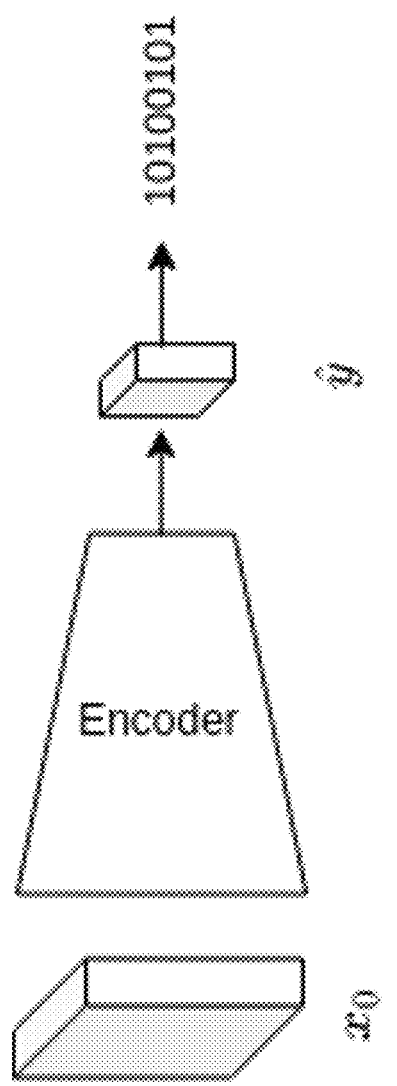
FIG. 4 illustrates an encoding pipeline. $x_0$ represents the image to be encoded, and $\hat{y}$ is the quantised latent space.

The encoding process may be the same as discussed above, but the trained parameters of the encoder will differ due to the inclusion of the CDD as a decoder. FIG. 4 shows the encoding process.

Figure 5:
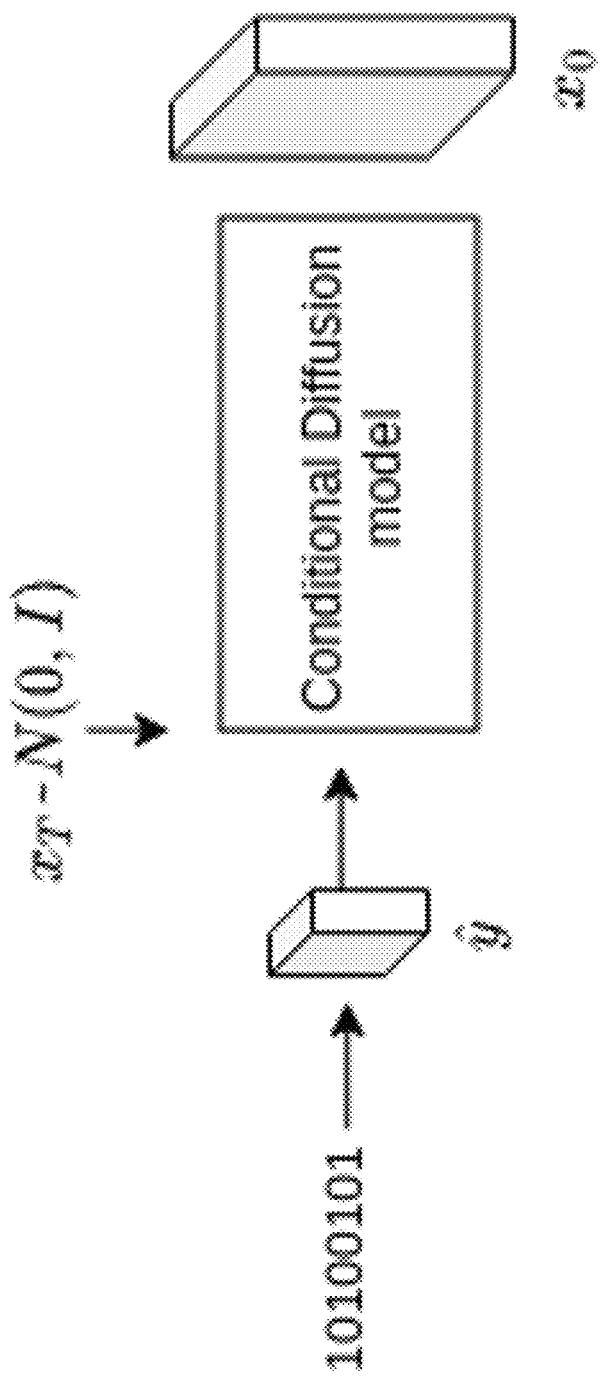
FIG. 5 illustrates a decoding pipeline. $\hat{x}_0$ represents the reconstructed image, and $\hat{y}$ is the quantised latent space.

For decoding, after the $\hat{y}$ is recovered from the bitstream using arithmetic decoding, we sample an $\epsilon$ from a standard normal for the first T, $x_T$, and perform the computation of the reverse pass as shown in Algorithm 2 for T number of steps to get out final output $\hat{x}_0$, where each step gets us closer to T=0. FIG. 5 also shows this process (without the iterative structure).

Furthermore, some decoded images using the CDD method are also shown in FIG. 7 to FIG. 10. We note that this model did not have the optional distortion penalty applied to it.

Algorithm 2 Example algorithm for decoding using conditional diffusion decoder for compression. BS is the bitstream received, which is decoded using an arithmetic decoder to get $\hat{y}$. Following from this, we sample a noise from a standard normal, condition on $\hat{y}$, and iteratively denoising using the learnt denoising function to get $x_0$ Inputs:

Received bitstream: BS
Decoder network: $D_\phi$
Arithmetic decoder: AD
Denoising function: $g_\theta$
Variance schedule: $\beta_{1...T}$
$\alpha_t = \sqrt{1 - \beta_t}$
$\bar{\alpha}_t = \Pi_{s=1}^t \alpha_s$
Reverse sampling:

$\hat{y} \leftarrow AD(BS)$
$x_T \sim N(0, I)$
for t = T..1 do
$\quad z \sim N(0, I)$
$\quad \bar{\alpha}_t \leftarrow \Pi_{s=1}^t \alpha_s$
$\quad \bar{\alpha}_{t-1} \leftarrow \Pi_{s=1}^{t-1} \alpha_s$
$\quad a_t = \sqrt{1 - \beta_t}$ $\quad \tilde{x}_0 \leftarrow (x_t - \sqrt{1 - \bar{\alpha}_t}\, g_\theta(x_t, \hat{y}, t))\dfrac{1}{\sqrt{\bar{\alpha}_t}}$ $\quad \tilde{\mu}_{t-1|t} = \dfrac{\sqrt{\alpha_t}(1 - \bar{\alpha}_t)}{1 - \bar{\alpha}_t} x_t + \dfrac{\sqrt{\bar{\alpha}_{t-1}}\, \beta_t}{1 - \bar{\alpha}_t} \tilde{x}_0$ $\quad \tilde{\beta}_{t-1|t} = \dfrac{1 - \bar{\alpha}_{t-1}}{1 - \bar{\alpha}_t} \beta_t$ $\quad x_{t-1} = \tilde{\mu}_{t-1|t} + \sqrt{\tilde{\beta}_{t-1|t}}\, z$
end
Output:

Decoded image: $\hat{x}_0$

The invention claimed is:

1. A method for lossy image or video encoding, transmission and decoding, the method comprising the steps of:
receiving an input image at a first computer system;
encoding the input image using a first trained neural network to produce a latent representation;
performing a quantization process on the latent representation to produce a quantized latent;
transmitting the quantized latent to a second computer system;
decoding the quantized latent using a trained denoising model, wherein the initial input to the trained denoising model is a sample from a standard normal conditioned with the upsampled quantized latent, to produce an output image;
wherein the output image is an approximation of the input image.

2. The method of claim 1, wherein the trained denoising model is a second trained neural network.

3. The method of claim 1, wherein the trained denoising performs an iterative process and includes a denoising function configured to predict a noise vector;
wherein the denoising function receives as input an output of the previous iterative step, the data based on the latent representation and parameters describing a noise distribution; and
the noise vector is applied to the output of the previous iterative step to obtain the output of the current iterative step.

4. The method of claim 3, wherein the parameters describing the noise distribution specify the variance of the noise distribution.

5. The method of claim 3, wherein the noise distribution is a gaussian distribution.

6. The method of claim 1, wherein the data based on the latent representation is upsampled prior to the application of the trained denoising model.

7. A method of training one or more models including neural networks, the one or more models being for use in lossy image or video encoding, transmission and decoding, the method comprising the steps of:
receiving a first input training image;
encoding the first input training image using a first neural network to produce a latent representation;
performing a quantization process on the latent representation to produce a quantized latent;
decoding the quantized latent using a trained denoising model, wherein the initial input to the trained denoising model is a sample from a standard normal conditioned with the upsampled quantized latent, to produce an output image, wherein the output image is an approximation of the first input training image;
evaluating a loss function based on the rate of the quantized latent;
evaluating a gradient of the loss function;
back-propagating the gradient of the loss function through the first neural network to update the parameters of the first neural network;
repeating the above steps using a first set of training images to produce a first trained neural network.

8. The method of claim 7, wherein the loss function includes a denoising loss; and
the denoising process includes a denoising function configured to predict a noise vector;
wherein the denoising function receives as input the first input training image with added noise, the data based on the latent representation and parameters describing a noise distribution;
the denoising loss is evaluated based on a difference between the predicted noise vector and the noise added to the first training image;
back-propagation the gradient of the loss function is additionally performed through the denoising model to update the parameters of the denoising model to produce a trained denoising model.

9. A data processing system, comprising at least one computer system configured to perform a method for lossy image or video encoding, transmission and decoding, the method comprising the steps of:

receiving an input image at a first computer system;

encoding the input image using a first trained neural network to produce a latent representation;

performing a quantization process on the latent representation to produce a quantized latent;

transmitting the quantized latent to a second computer system;

decoding the quantized latent using a trained denoising model, wherein the initial input to the trained denoising model is a sample from a standard normal conditioned with the upsampled quantized latent, to produce an output image;

wherein the output image is an approximation of the input image.

* * * * *